(12) United States Patent
De Haan et al.

(10) Patent No.: US 6,937,655 B2
(45) Date of Patent: Aug. 30, 2005

(54) RECOGNIZING FILM AND VIDEO OBJECTS OCCURING IN PARALLEL IN SINGLE TELEVISION SIGNAL FIELDS

(75) Inventors: Gerard De Haan, Eindhoven (NL); Rimmert B. Wittebrood, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 676 days.

(21) Appl. No.: 10/042,463

(22) Filed: Jan. 8, 2002

(65) Prior Publication Data

US 2002/0131499 A1 Sep. 19, 2002

(30) Foreign Application Priority Data

Jan. 11, 2001 (EP) .......................................... 01200082

(51) Int. Cl.[7] .................................................. H04N 7/12
(52) U.S. Cl. ...................... 375/240.12; 382/165; 348/97
(58) Field of Search ........................ 375/240.12, 240.15, 375/240.16; 348/441, 446, 448, 452, 97; 382/165, 174, 177

(56) References Cited

U.S. PATENT DOCUMENTS

| 4,982,280 | A | * | 1/1991 | Lyon et al. ................. 348/448 |
| 5,291,280 | A | * | 3/1994 | Faroudja et al. ......... 375/240.12 |
| 6,108,041 | A | * | 8/2000 | Faroudja et al. ............ 348/446 |
| 6,111,610 | A | * | 8/2000 | Faroudja ..................... 348/441 |
| 6,222,589 | B1 | * | 4/2001 | Faroudja et al. ............ 348/448 |
| 6,580,463 | B2 | * | 6/2003 | Swartz ........................ 348/558 |

FOREIGN PATENT DOCUMENTS

WO   WO 9916251   4/1999   ............ H04N/7/36

* cited by examiner

*Primary Examiner*—Gims Philippe
(74) *Attorney, Agent, or Firm*—Edward W. Goodman

(57) ABSTRACT

A method and arrangement for detecting a picture repetition mode of film material with a series of consecutive fields, the arrangement having a processor and a memory (M), the processor identifying a plurality of different objects within the consecutive fields using a segmentation method, an object being defined as an image portion of the consecutive fields that can be described with a single motion model; and carrying out the following steps for each one of the plurality of objects, i.e., establishing a motion parameter pattern for each one of the objects within the consecutive fields; comparing the motion parameter pattern with a number of predetermined motion parameter patterns; and determining the picture repetition mode for each one of the objects using the result of the preceding step.

13 Claims, 5 Drawing Sheets segmentation result 1

RECOGNIZING FILM AND VIDEO OBJECTS OCCURING IN PARALLEL IN SINGLE TELEVISION SIGNAL FIELDS

BACKGROUND OF THE INVENTION

1. Field of the Invention

The present invention relates to the field of detecting motion picture film sources in film material.

2. Description of the Related Art

In U.S. Pat. No. 5,734,735, a method and system is described that analyzes a series of video images. The types of production media used to produce these video images are detected. Each of the series of video images is segmented into a series of cells in order to retain spatial information. The spatial information is used to detect the type of production media. No technique is disclosed to detect types of production for different scenes within one image, coming from different sources and being mixed to form the single image.

U.S. Pat. No. 6,014,182 also relates to methods for detecting motion picture film sources. Such a detection might be useful in several environments, e.g., line doublers, television standard converters, television slow motion processing and video compression. For instance, a 60 Hz NTSC television signal has a 24 frame/second motion picture film as its source. In such a scheme, a 3-2 pull-down ratio is used, i.e., three video fields come from one film frame while the next two video fields come from the next film frame, etc. For example, calling subsequent video fields A, B, C, D, E, a 3-2 pull-down ratio would look like AAABBCCCDDEEE. Other sources have a 2-2 pull down ratio or relate to video camera, as is known to persons skilled in the art. Thus, comparing successive fields yields information about the motion picture source used.

U.S. Pat. No. 5,365,280 proposes using different motion vectors for different fields and generating a picture signal processing mode control signal that can be used by a television receiver as an indication that the fields relate either to movie-film or non-movie-film.

Motion estimation algorithms can be found in M. Tekalp, "Digital Video Processing", Prentice Hall, ISBN 0-13-190075-7. An overview of object-based motion estimation methods is given by Paolo Vicari, "Representation and regularization of motion fields with region-based models", thesis for the Politecnico di Milano, No. 598034.

So far, the prior has concentrated on detecting motion picture sources of either films having fields originating from a single motion picture source or films having subsequent fields originating from two or more different motion picture sources. However, an increasing number of films comprise mixtures of images within fields that originate from different motion picture sources. None of the prior art methods discussed above, are able to detect the picture repetition mode of individual images within fields of a film. For instance, in applications in picture rate conversion, however, an indication of the origin of the individual images within the fields needs to be known. More particularly, it is necessary to know whether the video originates from film material to optimally perform de-interlacing and film judder removal.

SUMMARY OF THE INVENTION

Therefore, it is an objective of the present invention to provide an apparatus and a method for detecting the picture repetition mode of individual objects within fields. In this context, an "object" may be a portion of an individual image in a field. An "object" is defined as an image portion that can be described with a single motion model. Such an "object" need not necessarily comprise one "physical" object, like a picture of one person. An object may well relate to more than one physical object, e.g., a person sitting on a bike where the movement of the person and the bike, essentially, can be described with the same motion model. On the other hand, one can safely assume that objects identified in this way belong to one single image originating from one single film source.

To obtain the objective of the present invention, it provides a method to detect a picture repetition mode of film material comprising a series of consecutive fields, the method comprising the following steps:

Establishing a motion parameter pattern for the film material;

Comparing the pattern with a number of predetermined motion parameter patterns;

Determining the picture repetition mode using the result of the preceding step; characterized in that, the method includes the following steps:

Identifying a plurality of different objects within the consecutive fields, an object being defined as an image portion of the consecutive fields that can be described with a single motion model;

Carrying out the following steps:

Establishing a motion parameter pattern for each one of the objects within the consecutive fields;

Comparing the motion parameter pattern with a number of predetermined motion parameter patterns; and Determining the picture repetition mode for each one of the objects using the result of the preceding step.

Thus, in accordance with the present invention, prior to detecting a film mode, the fields of the television signal are separated into different objects by means of a segmentation technique. Any known technique to do so might be used for that purpose. Then, the film mode of each individual object is detected. Any known film mode detection technique might be used for that purpose.

Preferably, a motion parameter estimation technique is used as well.

In particular, the invention uses the technique of motion parameter estimation to identify different image portions (objects) originating from different sources because of mixing.

The invention also relates to an arrangement for detecting a picture repetition mode of film material comprising a series of consecutive fields, the arrangement comprising processing means and a memory, the processing means being arranged to carry out the following steps:

Establishing a motion parameter pattern for the film material;

Comparing the pattern with a number of predetermined motion parameter patterns stored in the memory;

Determining the picture repetition mode using the result of the preceding step; characterized in that, the processing means are arranged to carry out the following steps:

Identifying a plurality of different objects within the consecutive fields, an object being defined as an image portion of the consecutive fields that can be described with a single motion model;

Carrying out the following steps:

Establishing a motion parameter pattern for each one of the objects within the consecutive fields;

Comparing the motion parameter pattern with a number of predetermined motion parameter patterns stored in the memory; and Determining the picture repetition mode for each one of the objects using the result of the preceding step.

Such an arrangement may, advantageously, be implemented on a chip, and such a chip may be arranged in a television.

The invention also relates to a computer program product to be loaded by a computer arrangement, comprising instructions to detect a picture repetition mode of film material comprising a series of consecutive fields, the arrangement comprising processing means and a memory, the computer program product, after being loaded, providing the processing means with the capability to carry out the following steps:

Establishing a motion parameter pattern for the film material;

Comparing the pattern with a number of predetermined motion parameter patterns stored in the memory;

Determining the picture repetition mode using the result of the preceding step; characterized in that, the processing means are arranged to carry out the following steps:

Identifying a plurality of different objects within the consecutive fields, an object being defined as an image portion of the consecutive fields that can be described with a single motion model;

Carrying out the following steps:

Establishing a motion parameter pattern for each one of the objects within the consecutive fields;

Comparing the motion parameter pattern with a number of predetermined motion parameter patterns stored in the memory; and Determining the picture repetition mode for each one of the objects using the result of the preceding step.

BRIEF DESCRIPTION OF THE DRAWINGS

The invention will now be explained with reference to the accompanying drawings that are only intended to illustrate the present invention and not to limit its scope, in which.

DESCRIPTION OF THE PREFERRED EMBODIMENT

Introduction

Figure 1:
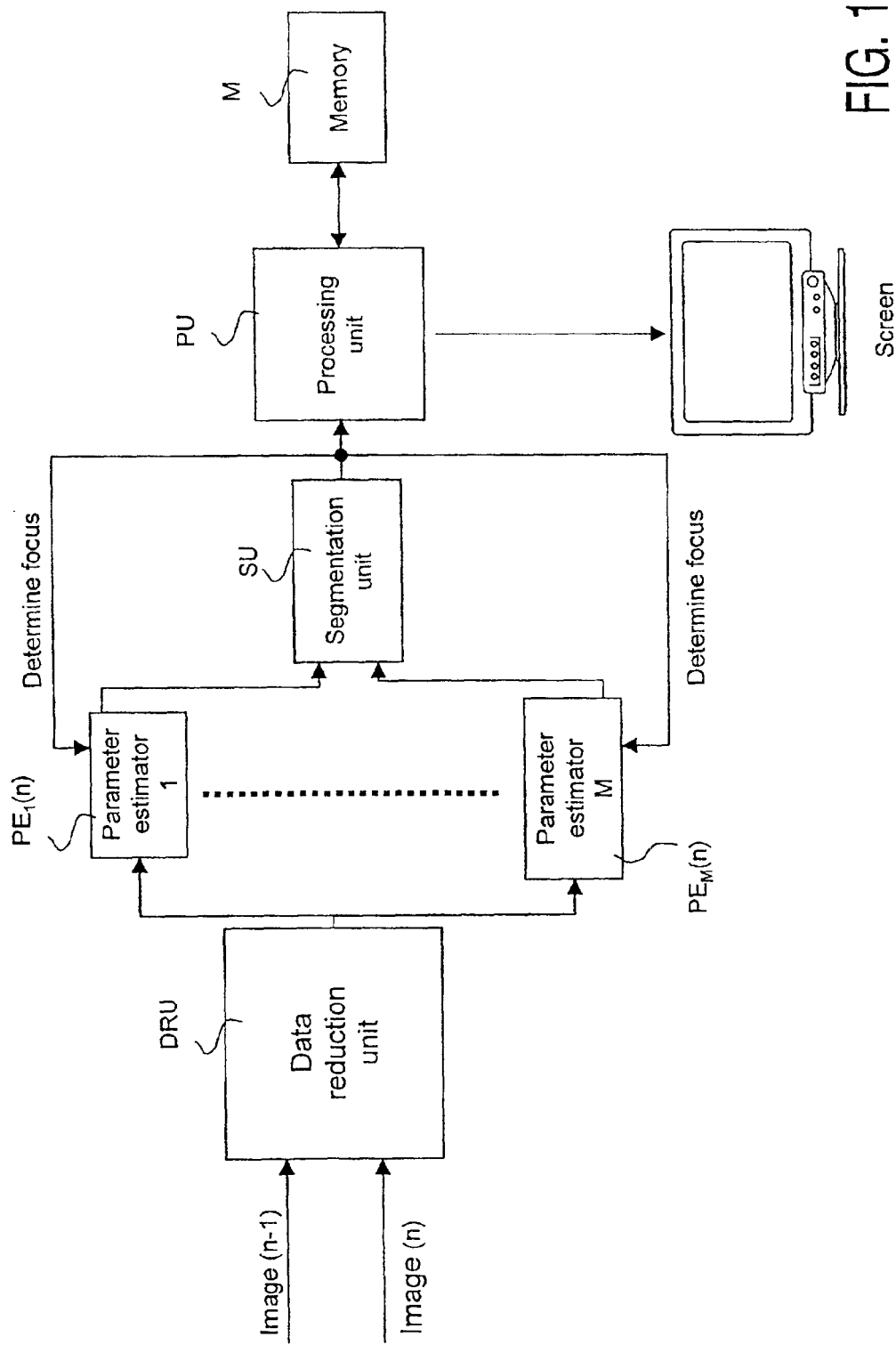
FIG. 1 shows a block diagram of a multiple parameter estimator and segmentation arrangement.

Hereinafter, a method to detect a film mode of individual objects in a scene is proposed. To that end, first of all, a method is described to identify individual objects in a scene. Individual objects are identified by motion estimation, i.e., those portions of a scene that can be described with a same motion model are identified as belonging to a same object in the scene. Motion estimators are known as such from the prior art, e.g., from Refs. [1], [3], [4], [5], and [6]. Of these references, Ref. [1] describes a motion estimator enabling identification of objects in a scene without the need to apply image segmentation.

For the present invention, a motion estimator is preferred that is designed to be suitable for picture rate conversion, with a computational complexity suitable for consumer electronics application, i.e., comparable to Refs. [5] and [6].

The most striking characteristic of the object motion estimator described earlier in Ref. [1], is that no effort is put in segmenting the image into objects prior to estimation of the model parameters, like in other prior art object motion estimators. Basically, a relatively small number of interesting image parts is selected, and a number of parallel motion model parameter estimators is trying to optimize their parameters on this data set. As soon as one of the estimators is more successful than another in a certain number of interesting image parts, it is focused on those parts, whereas the remaining estimators focus on the other parts. In short, individual estimators try to conquer image parts from one another, dividing the total image into "objects". This prior art object motion estimator allows a real-time object-based motion estimation and can advantageously be used in the film detection technique of the present invention.

Fundamentally, such an object-based motion estimator that wastes no effort in expensive segmentation of the image, should be able to compete in operations count with a block-based motion estimator, as one should expect less objects than blocks in realistic images. It is only in the assignment of image parts to objects that an effort is required comparable to the evaluation of candidate vectors on block basis. If the number of objects does not exceed the number of candidate vectors too much, the overhead of an object-based motion estimator should be negligible. It is assumed here that the motion per object can be described with fairly simple parametric models.

In the following subsections, we shall describe a preferred motion model used, an estimation of motion model parameters, a preferred cost function used, a segmentation process and a film-mode detection for individual objects within a scene.

Motion Model

To keep complexity low, the motion of each object o is described by a simple first-order linear model that can only describe translation and scaling. More complex parametric motion models are known to persons skilled in the art, e.g., models including rotation, and can indeed be applied in combination with the proposed algorithm, but will be disregarded here, as we shall introduce a refinement that makes such complex models obsolete.

The model used is:

$$\vec{D}_o(\vec{x}, n) = \begin{pmatrix} s_x(o, n) + x d_x(o, n) \\ s_y(o, n) + y d_y(o, n) \end{pmatrix} \quad (1)$$

using $\vec{D}_o(\vec{x}, n)$ for the displacement vector of object o at location $$\vec{x} = \begin{pmatrix} x \\ y \end{pmatrix}$$

in the image with index n. It is observed that $\vec{x}$ is associated with pixel locations.

Parameter Estimation

Given a motion model, next its parameters need to be optimized for a given object in the image. As stationary image parts occur in almost every sequence, we assume the presence of an 'object o, o >0', for which motion is described by $\vec{0}$, the zero vector. Clearly, no estimation effort is required to make this available. The parameter vectors of additional objects o, o >0, are estimated separately, in parallel, by their respective parameter estimators ($PE_m$, m=1,2, . . . , M), as shown in FIG. 1.

FIG. 1 shows a block diagram of an arrangement with a plurality of parameter estimators $PE_m(n)$ connected in parallel to the output of a data reduction unit DRU. The data reduction unit DRU is arranged to select a set of interesting image pixels that are to be used in the calculations. Inputs to the data reduction unit DRU are the image at time n and the image at time n−1. Each of the outputs of the parameter estimators $PE_m(n)$ is connected to a segmentation unit SU.

The output of the segmentation unit SU is fed back to the parameter estimators $PE_m(n)$ since, preferably, they together perform a recursive operation as will be explained below. The end result of the segmentation process is formed by groups of pixels of a scene, each group of pixels belonging to a different object and having assigned to it a different motion vector. These output data are supplied to a processing unit PU that is arranged to detect the type of film source per object and to perform predetermined tasks on the different objects such as picture rate conversion. The processing unit PU is connected to memory M storing predetermined motion parameter patterns used to detect the type of film source as will be explained below. The memory M may be of any known type, i.e., RAM, ROM, EEPROM, hard disc, etc. The output of the processing unit PU, for instance, controls a television screen.

It is observed that the data reduction unit DRU, the parameter estimators $PE_m(n)$, the segmentation unit SU and the processing unit PU are shown as separate blocks. These blocks may be implemented as separate intelligent units having distinct processors and memories. However, as is evident to persons skilled in the art, these units may be integrated into a single unit such as a general purpose microprocessor comprising a processor and suitable memory loaded with suitable software. Such a microprocessor is not shown but known from any computer handbook. Alternatively, the arrangement shown in FIG. 1 may be implemented as a hard-wired logic unit, as known to persons skilled in the art. Preferably, the entire arrangement shown in FIG. 1 is encapsulated as a single chip in a single package. Such a single chip package can be easily included in a television apparatus.

Each parameter estimator $PE_m(n)$ updates a previously estimated parameter vector, after which, the best parameter candidate vector, according to a cost function, is selected as the result parameter vector for that object.

Considering the four parameter model of equation (1), the parameters of object o, o >0, are regarded as a parameter vector $\vec{P}_o(n)$:

$$\vec{P}_o(n) = \begin{pmatrix} s_x(o, n) \\ s_y(o, n) \\ d_x(o, n) \\ d_y(o, n) \end{pmatrix} \quad (2)$$

and we define as our task to select a parameter vector $\vec{P}_o(n)$ from a number of candidate parameter vectors $\vec{C}_o(n)$ as the one that has the minimal value of a cost function, to which we shall return later on.

Preferably, the candidates are generated much similar to the strategy exploited in Refs. [5] and [6], i.e., take a prediction vector, add at least one update vector, and select the best candidate parameter vector according to an error criterion. Candidate parameter set $CS_o(n)$ contains three candidates $\vec{C}_o(n)$ according to:

$$CS_o(n) = \{\vec{C}_o(n) | \vec{C}_o(n) = \vec{P}_o(n-1) + m\vec{U}_o(n),$$
$$\vec{U}_o(n) \in US_o(n), m = -1, 0, 1,\} \quad (3)$$

with update parameter $\vec{U}_o(n)$ selected from update parameter set $US_o(n)$:

$$US_o(n) = \left\{ \begin{pmatrix} i \\ 0 \\ 0 \\ 0 \end{pmatrix}, \begin{pmatrix} o \\ i \\ 0 \\ 0 \end{pmatrix}, \begin{pmatrix} 0 \\ 0 \\ i \\ 0 \end{pmatrix}, \begin{pmatrix} 0 \\ 0 \\ 0 \\ i \end{pmatrix} \right\} \quad (4)$$

(i = 1, 2, 4, 8, 16).

The Cost Function

Given the motion model and some candidate parameter sets, we need to select the best candidate, according to a cost function, as the result for a given object. The cost function can be a sum of absolute differences between motion-compensated pixels from neighboring images, with vectors generated with the (candidate) motion model. However, we need to know the area to which the motion model is to be assigned. The two issues, segmentation and motion estimation, are inter-dependent. In order to correctly estimate the motion in one object, the object should be known and vice versa.

As a first step in the motion estimation process, we define a set with pixel blocks of interest. These form the set SI(n) of "interesting" image parts that will be used as a basis for optimization of all parametric models.

Now, the focus of the individual parameter estimators has to be on different objects. To this end, each parameter estimator $PE_m(n)$ will calculate its cost function on the same set of interesting locations defined in set SI, giving different locations a different weight factor, $W_o(\vec{X})$. Here, $\vec{X}$ is associated with a position of a block of pixels. The proposed algorithm is straightforward:

The pixel values are multiplied with a first weight factor larger than 1, e.g., 8, in case the pixel in SI(n) belonged to the same object, i.e., the same parameter estimator, according to the previous image segmentation step.

The pixel values are multiplied with a second weight factor smaller than 1, e.g., 0.1, in case the segmentation assigned the position to another parameter estimator and this estimator achieved low match errors.

Figure 2A:
FIGS. 2A, 2B, 2C, 2D show television screen photographs illustrating a process of selecting-points of interest on which parameter estimators optimise their parameters.
Figure 2B:
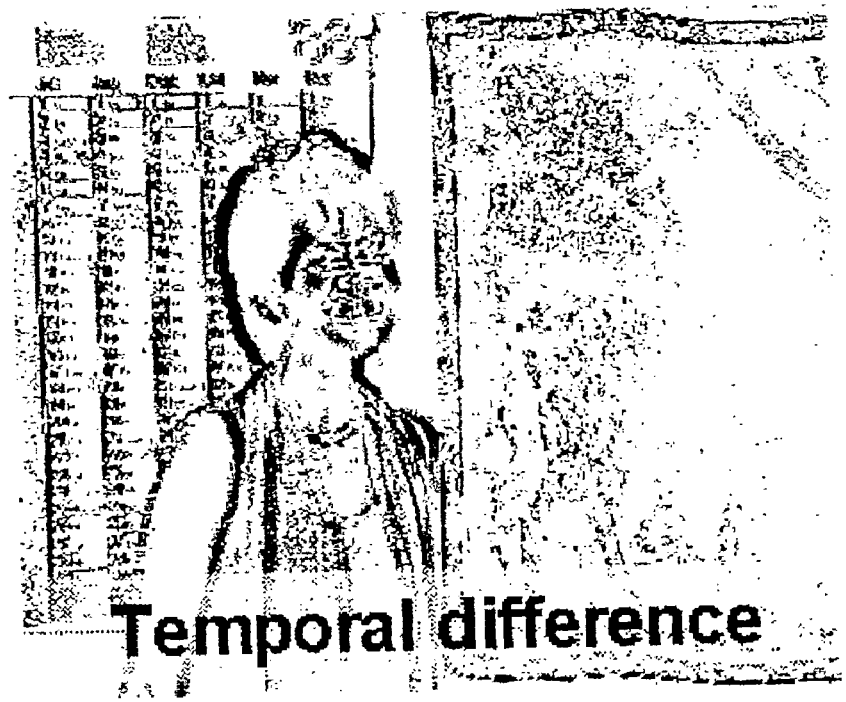
Figure 2C:
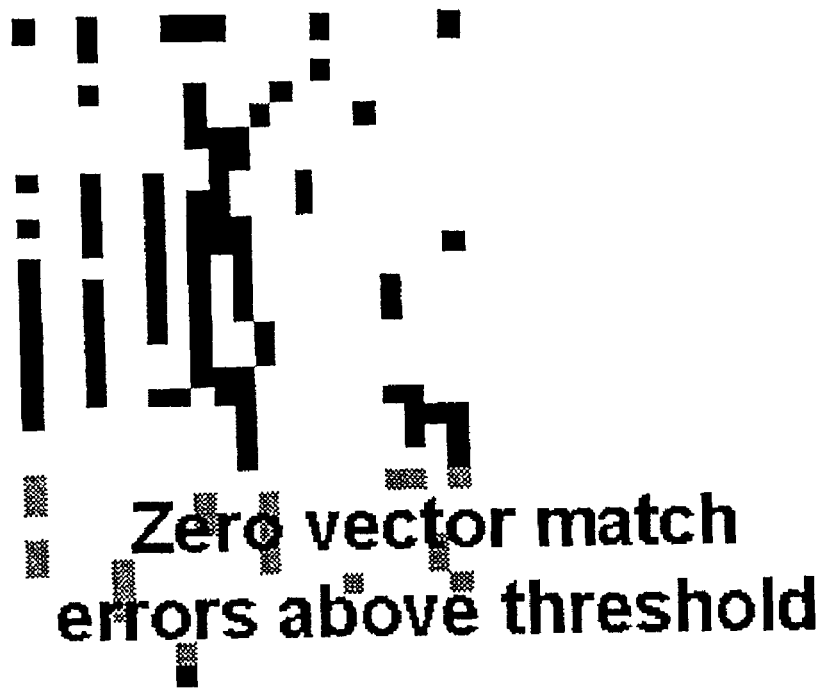
Figure 2D:
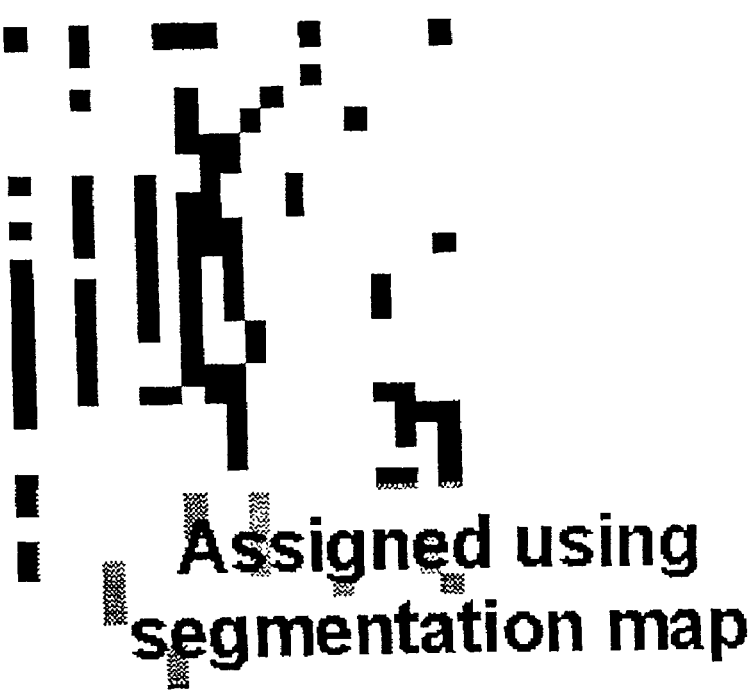

FIGS. 2A–2D give an example of a selection of pixel blocks of interest in an image with a single moving object, i.e., a bicyclist, and a moving background. This selection is carried out by the Data Reduction Unit DRU. Thus, the Data Reduction Unit renders a set of most interesting pixel elements (SI), resulting in a rather cheap (few calculations) and an effective parameter estimation. FIGS. 2A–2D show screen photographs illustrating a process of selecting points of interest on which the parameter estimators optimize their parameters. The temporal difference image, between two successive pictures, is not actually calculated, but it serves to understand why the high match errors of the vector $\vec{0}$, i.e., the total set with points of interest, are at the positions shown in FIG. 2C. In FIG. 2D, it is shown how, in this example, the focus of two parameter estimators is divided over the points of interest. That is, FIG. 2D shows that there are two different motion models detected. The two sub-sets are shown in different brightnesses, i.e., one in black and the other one in gray.

The moving background of the image is object o=1, and the bicyclist is object o=2. There are two parameter estimators that are both optimized on the same set containing the blocks of interest, but as soon as one estimator is selected in the segmentation to be best in an area, the pixel block of interest in that area is emphasized in the cost function. After a while, this converges to the situation illustrated, where one estimator focuses on the gray blocks and the other on the white pixel blocks in SI(n).

More formally, the cost function is calculated according to:

$$\varepsilon(\vec{C}_o, n) = \sum_{\vec{x} \in SI} W_o(\vec{x}) \cdot |F_s(\vec{x}, n) - F_s(\vec{x} - \vec{C}_o(\vec{x}, n), n-1)| \quad (5)$$

where $F_s(\vec{x}, n)$ is the luminance value of a pixel at position $\vec{x}$ in a sub-sampled image with index n, and $\vec{C}_o(\vec{x}, n)$ is the vector resulting from candidate model $\vec{C}_o(n)$ at position $\vec{x}$.

The sub-sampling effectively reduces the required memory bandwidth. Images are sub-sampled with a factor of four horizontally and a factor of two vertically on a field base, generating a sub-sampled image $F_s(n)$ from each original field F(n). In order to achieve pixel accuracy on the original pixel grid of F, interpolation is required on the sub-sampling grid.

Recursive Segmentation

The segmentation is the most critical step in the algorithm. Its task is to assign one motion model to each group of pixels. For each block, a block match error, $\varepsilon_o(\vec{X}, n)$, corresponding to each of the estimated parameter vectors, $\vec{P}_o$, can be calculated according to:

$$\varepsilon(\vec{X}, n) = \sum_{\vec{x} \in B(\vec{X})} |F_s(\vec{x} + (1-\alpha)\vec{D}_o(\vec{x}, n), n) - F_s(\vec{x} - \alpha \vec{D}_o(\vec{x}, n), n-1)| \quad (6)$$

The temporal instance where this segmentation is valid is defined by $\alpha$.

We adopted a recursive segmentation method that closely resembles the strategy of a 3-D RS block matcher, e.g., as disclosed in Ref. [5], i.e., use spatial and temporal predictions of the best $PE_m(n)$, and penalize choosing a $PE_m(n)$ that does not occur in the spatio-temporal neighborhood. Formally, the segmentation mask $M(\vec{X}, n)$ assigns the object o with the lowest local modified cost function $\epsilon_o(\vec{X}, n)$ to the block $B(\vec{X})$, where:

$$\epsilon_o = \epsilon_o + P(\vec{X}, n) \quad (7)$$

while $P(\vec{X}, n)$ is a penalty chosen according to the following rule:

$$P(\vec{X}, n) = \begin{cases} P_s, & (M(\vec{X}+\vec{\delta}, n) = o) \\ P_t, & (M(\vec{X}-\vec{\delta}, n-1) = o) \\ P_u, & \text{(otherwise)} \end{cases} \quad (8)$$

and $$\vec{\delta} = \begin{pmatrix} i \\ j \end{pmatrix}, i, j = 0, \pm 1 \quad (9)$$

Figure 3A:
FIGS. 3A, 3B, 3C, 3D show television screen photographs illustrating a process of segmentation.
Figure 3B:
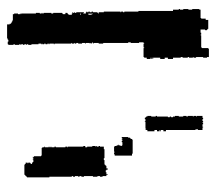
Figure 3C:
Figure 3D:

Similar to what has been suggested for the 3-D RS block matcher (Ref. [5]), $P_u$ is the largest penalty, $P_t$ just a small one, while there is no reason why $P_s$ could not just be zero. A fairly obvious simplification is to fix $\vec{\delta}$ to the direction opposite to the scanning direction, and to alternate the scanning from field to field. FIGS. 3A–3D give an example of segmentation according to the object-based motion estimation method, with the original luminance image. FIGS. 3A–3D show photographs taken from a television screen and illustrating the process of segmentation. FIG. 3A shows the original image while FIGS. 3B–3D show consecutive segmentation results. Clearly, the first image, in FIG. 3A, has a poor, almost random, segmentation. However, the focusing of the individual estimators to their area in the segmentation rapidly converges to a useful segmentation: FIG. 3D shows that two different objects can be distinguished, one relating to the bicyclist and one relating to the back ground.

Prior Art Film-Mode Recognition

Apart from the calculation of motion vectors for every object in the picture, applications in picture rate conversion require an indication of the origin of the picture sequence. More particularly, it is necessary to know whether the video originates from film material to optimally perform de-interlacing and film judder removal. Moreover, it is necessary to distinguish between 2-2 pull down image material, 2-3 pull down material, and video from a video camera.

As discussed earlier here, in prior art methods, this detection concerns a global decision, i.e., discrimination between video camera and the various film formats is done only for entire images.

As an adaptation of Ref. [8], for the object-based motion stimator, a reliable movie detector can be realized analyzing the motion described by the parameter estimator only that covers the largest area of the image, obviously disregarding the zero-vector 'estimator'.

Let us define max(n) as the largest component of parameter vector $P_o(n)$ (rather than taking the largest component of the parameter vector, it is equally well possible to use the average, absolute, or the summed absolute value of either or both of the parameter components), i.e.:

$$\max(n)=\max\{s_x(o,n), s_y(o,n), d_x(o,n), d_y(o,n)\} \quad (10)$$

We now assemble the recent history set RH(n) as:

$$RH(n)=\{\max(n), \max(n-1), \max(n-2), \max(n-3), \max(n-4), \max(n-5), \max(n-6)\} \quad (11)$$

which, with adaptive thresholding, is converted into a binary movie detection set MD(n), that, for 2-2 pull-down, will gives something like:

$$MD(n)=\{0,1,0,1,0,1,0\}, \quad (12)$$

for 2-3 pull-down, something like:

$$MD(n)=\{0,1,0,0,1,0,1\}, \quad (13)$$

and for video, something like:

$$MD(n)=\{1,1,1,1,1,1,1\}. \quad (14)$$

Comparing the actual set with a limited number of known patterns stored in memory M, yields information on movie type and phase. In case of scene cuts, the detector yields the output unreliable, which indicates that motion compensation can better be switched off.

Film-Mode Recognition According to the Invention

The invention concerns a method to detect the film mode of individual objects in a scene. More and more, images from different sources are mixed during production. We, therefore, propose to adapt the object-based motion estimator such that it, along with the motion parameter estimation of the objects in the scene, decides upon their origin.

To this end, we analyze the motion described by all individual parameter estimators.

Let us define $\max_o(n)$ as the largest component of parameter vector $P_o(n)$ (rather than taking the largest component of the parameter vector, it is equally well possible to use the average, absolute, or the summed absolute value of either or both of the parameter components), i.e.:

$$\max_o(n)=\max\{s_x(o,n), s_y(o,n), d_x(o,n), d_y(o,n)\}. \quad (15)$$

We now assemble the recent history sets $RH_o(n)$ as:

$$RH_o(n)=\{\max_o(n), \max_o(n-1), \max_o(n-2), \max_o(n-3), \max_o(n-4), \max_o(n-5), \max_o(n-6)\} \quad (16)$$

which, with adaptive thresholding, are converted into binary movie detection sets $MD_o(n)$, that, for a 2-2 pull-down object, will give something like:

$$MD_o(n)=\{0,1,0,1,0,1,0\}, \quad (17)$$

for 2-3 pull-down, something like:

$$MD_o(n)=\{0,1,0,0,1,0,1\}, \quad (18)$$

and for video, something like:

$$MD_o(n)=\{1,1,1,1,1,1,1\}. \quad (19)$$

Comparing the actual set with a limited number of known patterns stored in memory M, yields information on movie type and phase for every individual object. In case of scene cuts, the detector yields the output unreliable, which indicates that motion compensation can better be switched off for all objects.

LIST OF REFERENCES

[1] G. de Haan, R. J. Schutten, and A. Pelagotti, "Motion estimation and motion compensated interpolation", WO 99/16251.

[2] de Haan, "Judder-free video on PC's", Proc. of the WinHEC'98, March 1998, Orlando, (CD-ROM).

[3] G. de Haan and P. W. A. C. Biezen, "An efficient true-motion estimator using candidate vectors from a parametric motion model", IEEE Tr. on Circuits and Systems for Video Technology, Vol. 8, no. 1, March 1998, pp. 85–91.

[4] R. J. Schutten and G. de Haan, "Real-time 2-3 pull-down elimination applying motion estimation/compensation on a programmable device", IEEE Tr. on Consumer Electronics, Vol. 44, No. 3, August 1998, pp. 930–938.

[5] G. de Haan, P. W. A. C Biezen, H. Huijgen, and O. A. Ojo, "True Motion Estimation with 3-D Recursive Search Block-Matching", IEEE Tr. on Circuits and Systems for Video Technology, Vol. 3, October 1993, pp. 368–388.

[6] G. de Haan, and P. W. b. A. C. Biezen, "Sub-pixel motion estimation with 3-D recursive search block-matching", Signal Processing: Image Communication 6, 1994, pp.229–239. G. de Haan, J. Kettenis, and B. Deloore, "IC for Motion Compensated 100 Hz TV, with a Smooth Motion Movie-Mode", IEEE Tr. on Consumer Electronics, vol. 42, no. 2, May 1996, pp. 165–174.

[7] G. de Haan and P. W. A. C. Biezen, "Time-recursive de-interlacing for high-quality television receivers", Proc. of the Int. Workshop on HDTV and the Evolution of Television, Taipei, Taiwan, November 1995, pp. 8B25–8B33.

[8] G. de Haan, H. Huijgen, P. W. A. C. Biezen, and O. A. Ojo, "Method and apparatus for discriminating between movie film and non-movie film and generating a picture signal processing mode control signal", U.S. Pat. No. : 5,365,280, Nov. 15, 1994.

What is claimed is:

1. A method of detecting a picture repetition mode of film material comprising a series of consecutive fields, the method comprising the following steps:

establishing a motion parameter pattern for said film material;

comparing said pattern with a number of predetermined motion parameter patterns; and determining said picture repetition mode using the result of the preceding step, characterized in that said establishing step comprises the sub-steps:

identifying a plurality of different objects within said consecutive fields, an object being defined as an image portion of said consecutive fields that can be described with a single motion model; and establishing a motion parameter pattern for each one of said objects within said consecutive fields, in that said comparing step comprises comparing each established motion parameter pattern with a number of predetermined motion parameter patterns, in that said determining step comprises determining said picture repetition mode for each one of said objects using the result of the comparing step.

2. An arrangement for detecting a picture repetition mode of film material comprising a series of consecutive fields, the arrangement comprising processing means and a memory, the processing means being arranged to a motion parameter pattern for said film material, compare said pattern with a number of predetermined motion parameter patterns stored in said memory, and determine said picture repetition mode using the result of the preceding step, characterized in that said processing means comprises:

means for identifying a plurality of different objects within said consecutive fields, an object being defined as an image portion of said consecutive fields that can be described with a single motion model;

means for establishing a motion parameter pattern for each one of said objects within said consecutive fields;

means for comparing each established motion parameter pattern with a number of predetermined motion parameter patterns stored in said memory; and means for determining said picture repetition mode for each one of said objects using the results of the comparison.

3. The arrangement as claimed in claim 2, wherein said identifying means identifies said plurality of different objects by also using a motion estimation technique.

4. The arrangement as claimed in claim 3, wherein said identifying means comprises a plurality of motion model parameter estimators operating in parallel to carry out said motion estimation technique.

5. The arrangement as claimed in claim 2, wherein said identifying means comprises a segmentation unit for performing a recursive segmentation method to identify said plurality of objects.

6. The arrangement as claimed in claim 2, wherein said identifying means comprises a data reduction unit.

7. The arrangement as claimed in claim 2, wherein said predetermined motion parameter patterns relate to at least one of the following set of film modes: a 2-2 pull-down mode, a 3-2 pull-down mode, and video mode.

8. The arrangement as claimed in claim 2, wherein said arrangement further comprises a film processing unit for carrying out a film material processing step.

9. The arrangement as claimed in claim 8 wherein said film processing unit is arranged to carry out at least one of the following steps: picture rate conversion, de-interlacing, and film judder removal.

10. A single chip package provided with an arrangement claimed in claim 2.

11. A television apparatus provided with a single chip package as claimed in claim 10.

12. A computer program product to be loaded into a computer arrangement, said computer program product comprising instructions for causing said computer arrangement to detect a picture repetition mode of film material comprising a series of consecutive fields, wherein the computer arrangement comprises processing means and a memory, and wherein the computer program product, after being loaded into said computer arrangement, causes said processing means:

identify a plurality of different objects within said consecutive fields using a motion estimation, an object being defined as an image portion of said consecutive fields that can be described with a single motion model;

establish a motion parameter pattern for each one of said objects within said consecutive fields;

compare each established motion parameter pattern with a number of predetermined motion parameter patterns stored in said memory; and determine said picture repetition mode for each one of said objects using the result of the comparison.

13. A data carrier provided with a computer program product as claimed in claim 12.

* * * * *